United States Patent [19]

Nakasone et al.

[11] Patent Number: 4,907,854
[45] Date of Patent: Mar. 13, 1990

[54] SPACER FOR CARRYING OPTICAL FIBERS

[75] Inventors: Takayoshi Nakasone, Koriyama; Kazuo Yasuda, Gifu, both of Japan

[73] Assignee: Ube-Nitto Kasei Co., Ltd., Tokyo, Japan

[21] Appl. No.: 339,823

[22] PCT Filed: Jun. 17, 1988

[86] PCT No.: PCT/JP88/00598
§ 371 Date: Dec. 6, 1988
§ 102(e) Date: Dec. 6, 1988

[87] PCT Pub. No.: WO88/10442
PCT Pub. Date: Dec. 29, 1988

[30] Foreign Application Priority Data

Jun. 17, 1987 [JP] Japan ................................. 62-91930

[51] Int. Cl.$^4$ .............................................. G02B 6/44
[52] U.S. Cl. ................................................. 350/96.23
[58] Field of Search ............... 350/96.10, 96.20, 96.23, 350/96.29

[56] References Cited

U.S. PATENT DOCUMENTS 4,154,049  5/1979  King et al. ................... 350/96.23 X

FOREIGN PATENT DOCUMENTS 56-87005  7/1981  Japan .
59-138802  9/1984  Japan .

Primary Examiner—John D. Lee
Attorney, Agent, or Firm—Wenderoth, Lind & Ponack

[57] ABSTRACT

An optical fiber carrying spacer has helical grooves for carrying optical fibers with each groove changing the direction of its helix for each turn about the spacer. Each helical groove includes extra-length portions and compensating portions both formed at a smaller angle to a longitudinal axis of the spacer than main groove portions. The extra-length portions are each provided at a position where the direction of the helix changes. The compensating portions are each provided between adjacent extra-length portions at an angular distance ranging from ¼ to ¾ of the circumference of the spacer. The spacer effectively prevents stresses from being applied to the optical fibers along the longitudinal direction when the spacer is bent or curved.

3 Claims, 3 Drawing Sheets

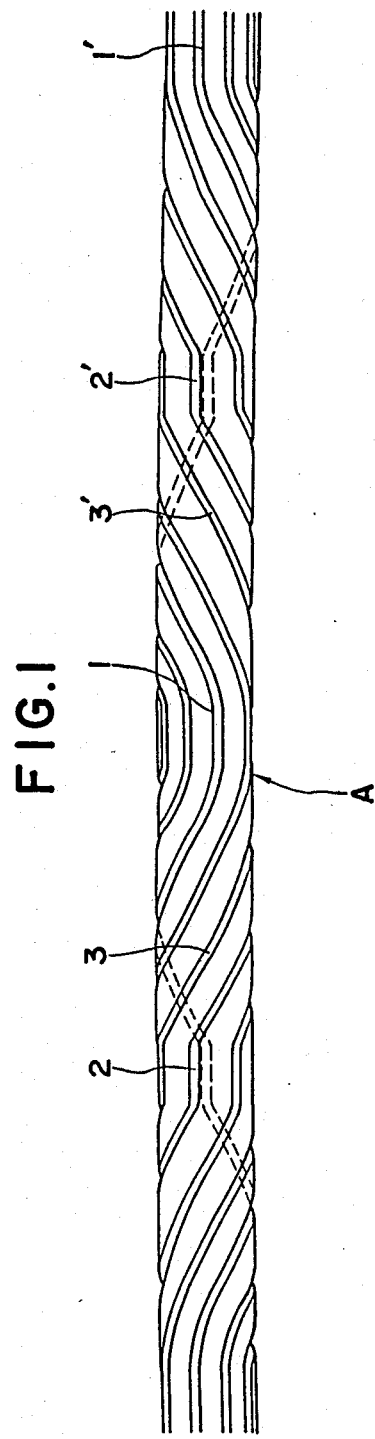

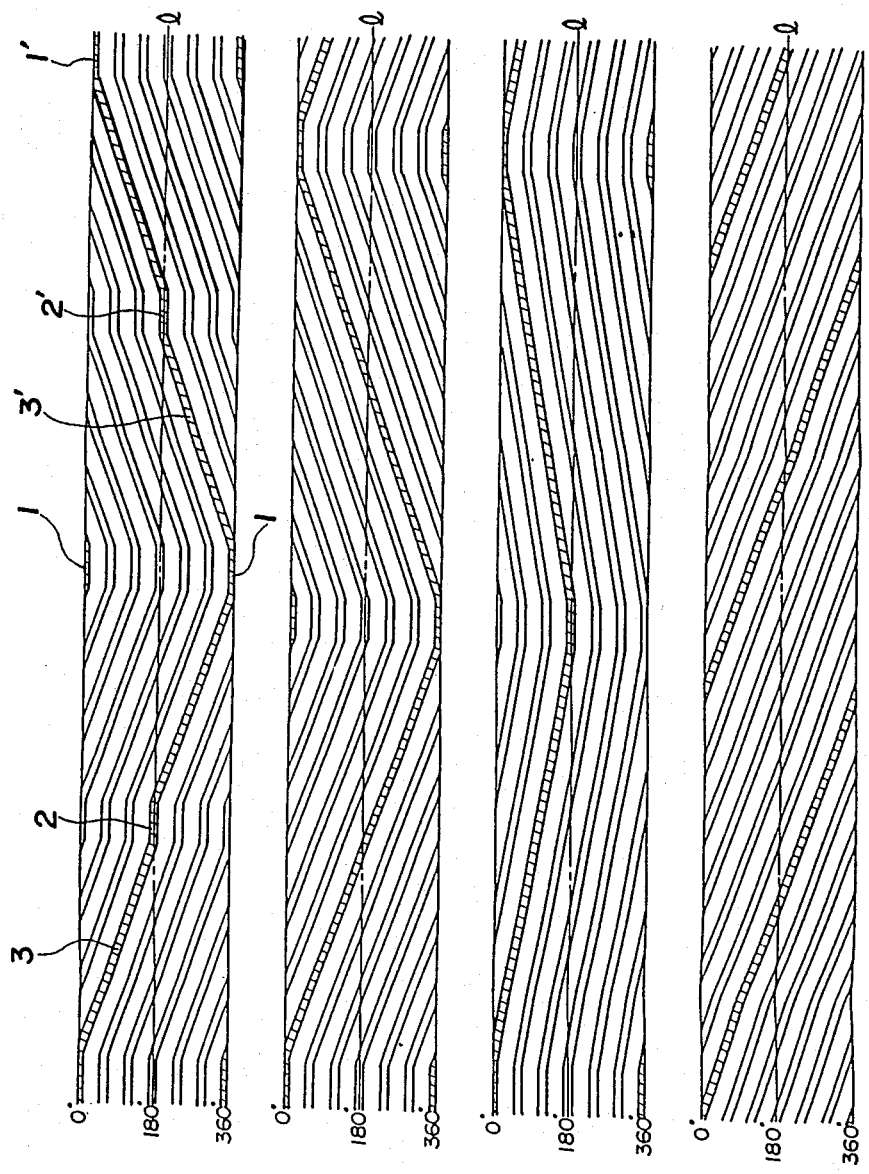

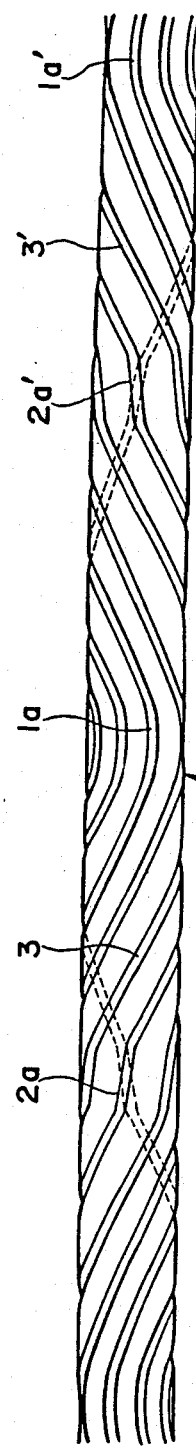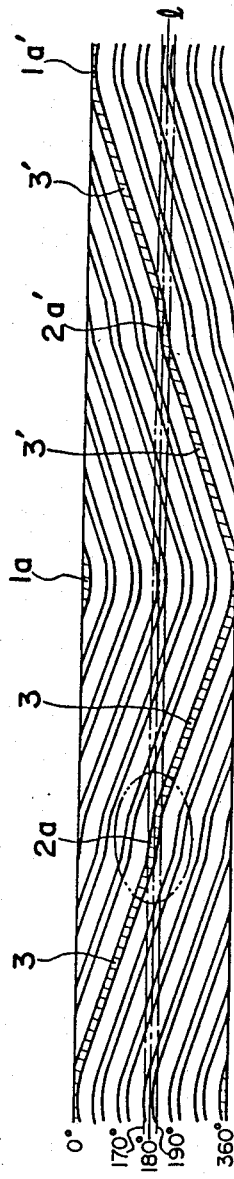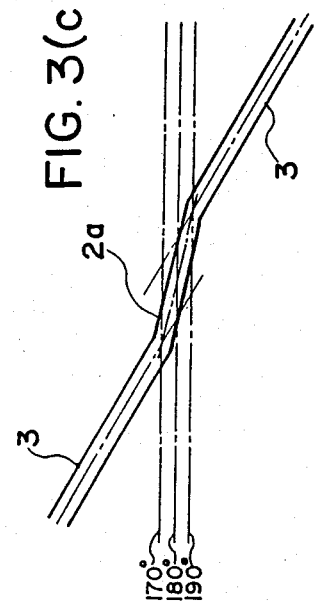

SPACER FOR CARRYING OPTICAL FIBERS

BACKGROUND OF THE INVENTION

The present invention relates to an optical fiber spacer which is used as an element of an optical fiber cable for protecting and carrying optical fibers.

In assembling a number of optical fibers into an optical fiber cable, a spacer is employed which has helical grooves formed on its outer peripheral surface for receiving the optical fibers. Of conventional spacers of this kind, a spacer of the type having grooves which continuously helically extend in only one direction about the entire circumference of the spacer such that the grooves cover an angular range of 360° is preferable in that even if the spacer is bent after assembling optical fibers into a cable, stresses applied to the fibers lengthwise thereof are substantially equalized. However, this spacer presents a problem as it needs a large-scale device for fitting the optical fibers into the grooves.

That is to say, to fit optical fibers into grooves helically extending around the spacer in one direction, it is necessary that bobbins each having wound thereon an optical fiber be rotated about the spacer, or a cable take-up drum be turned so as to rotate the cable around its axis. In either case, a special device is needed therefor, inevitably resulting in the entire mechanism involved becoming complex, large-scale and expensive.

To overcome the above-noted problem, there have been proposed, for example, a spacer of the type having helical grooves each of which changes its direction to the right (clockwise) and left (counterclockwise) alternately at a predetermined angle below 360°, and a spacer of the type in which optical fibers set in paper or plastic tapes having V- or U-shaped cross section are helically arranged around a tension member such that each optical fiber covers an angular range of less than 360° while changing its direction to the right and left alternately.

With such spacers which have helical grooves changing in direction to the right and left alternately, when the optical fiber cable is bent, grooves inside and outside the bent portion differ in length with respect to each other. Accordingly, in the case where optical fibers are disposed on a particular side of the spacer, bending of the cable will lead to scattering stresses that are applied to the optical fibers, introducing difficulties in taking up the cable onto a drum or laying the cable in a bent or curved form, for instance.

That is to say, when the grooves are each formed helically extending around a portion of the spacer of less than 180°, optical fibers outside the bend of the spacer will be stretched and the optical fibers inside the bend compressed; this degrades the transmission characteristics of the optical fibers, and hence impairs their reliability.

As a solution to these problem there has also been suggested a spacer in which each groove is formed wide or deep at its direction changing portion to provide therein an extra length for the optical fiber, but this involves additional steps in forming the groove.

It is therefore an object of the present invention to provide a novel optical fiber carrying spacer which permits fitting of optical fibers into grooves by use of relatively simple facilities and remarkably reduces stresses which are applied to the optical fibers in their longitudinal direction when the resulting optical fiber cable is bent.

DISCLOSURE OF THE INVENTION

According to the present invention, in an optical fiber carrying spacer which has helical grooves for receiving optical fibers with each groove changing the direction of its helix for each turn about the spacer body, each helical groove includes extra-length portions and compensating portions formed at a smaller angle to a longitudinal axis of the spacer than main groove portions. The extra-length portions are provided at positions where the direction of the helix changes, while the compensating portions are each provided between adjacent extra-length portions at a position spaced apart from the direction changing position by an angular distance ranging from ¼ to ¾ of the circumference of the spacer body.

The helical grooves of the optical fiber carrying spacer according to the present invention can be obtained in the following manner. In the case where the spacer is made of a thermoplastic resin, the grooves are formed by profile extrusion of molten resin from a revolving nozzle around a tension member, or by covering the tension member with the thermoplastic resin to form a columnar rod-like spacer body and then cutting the grooves in its peripheral surface. In the case of making the spacer of aluminum or like metal, straight grooves are formed on the spacer body and then the spacer body is twisted to form the helical grooves. The spacer of the present invention is not limited specifically to any particular manufacturing method and material.

In forming the helical grooves by, for instance, the afore-mentioned profile extrusion of molten resin from a revolving nozzle, an abrupt change of the revolving direction of the nozzle will cause an increase in a mechanical or electrical load on a molding machine and a resultant groove having sudden changes in direction will involve difficulty in subsequent operation of fitting the optical fibers. It is therefore desirable, for a smooth change of the direction of the helical grooves, to gradually decrease the rotational speed of the nozzle before changing its revolving direction and thereafter to gradually increase the speed up to a predetermined value. Also in the case of cutting the grooves in the peripheral surface of the afore-mentioned columnar rod-like spacer body, the revolution of a cutter or the spacer body to be cut involves the same problem as mentioned above. Accordingly, it is desirable to similarly control the revolving speed of the cutter or spacer body at the direction changing portions.

The extra-length portions are provided to allow a smooth change of the direction of the grooves during the manufacturing process and to ensure an easy fitting of the fibers into the grooves. The "extra-length portion" herein is used to include the direction changing point and groove portions immediately contiguous thereto and has a smaller angle to the longitudinal axis of the spacer body than the main groove portions. The compensating portions are provided for preventing distortion of the optical fiber which would otherwise be caused by a change in length of the groove occurring in the extra-length portions when the spacer is bent or curved. Each compensating portion is formed between adjacent extra-length portions and has a smaller angle to the longitudinal axis of the spacer body than the main groove portions. The compensating portion is not limited specifically to any particular angle and shape so long as it is able to substantially cancel the length variation in the extra-length portion.

The compensating portion may preferably be provided on the opposite side from the extra-length portion with respect to a neutral plane of bending, which plane includes a longitudinal axis of the spacer body, and more preferably at a position symmetrical with respect to the neutral plane, i.e. at a position diametrically opposite from the extra-length portion.

When the spacer is curved or bent, it is stretched and compressed on the outside and inside of the neutral axis, respectively, as mentioned previously. According to the present invention, in the formation of the helical grooves, each extra-length portion is provided at the direction reverse position so as to facilitate the change of direction and the compensating portion is provided between the extra-length portions. Accordingly, an optical fiber fitted in the groove, when curved, is permitted to move from the compressed side to the stretched side within one pitch of the groove, and further the compressive and tensile strains applied to the optical fiber substantially balance each other, so that the stress applied to the optical fiber in the longitudinal direction thereof can be reduced or absorbed.

BRIEF DESCRIPTION OF THE DRAWINGS

FIG. 1 is a side view illustrating an embodiment of an optical fiber carrying spacer according to the present invention;

FIGS. 2(a) to 2(d) are developments showing grooves in Example 1, Comparative Examples 1 and 2, and Reference Example 1; and FIGS. 3(a) to 3(c) are a side view and developments, respectively, illustrating another embodiment of the present invention. FIG. 3(c) is a detail of a portion of FIG. 3(b).

DETAILED DESCRIPTION OF THE INVENTION

Example 1

An optical fiber carrying spacer having six helical grooves A with U-shaped cross section, as shown in FIGS. 1 and 2(a), was produced as follows. First, a 2.8 mm diametered core was prepared by coating a FRP (Fiberglass Reinforced Plastics) rod of 2.0 mm diameter with a layer formed of a mixture of linear low-density polyethylene and high-density polyethylene to 0.4 mm thickness. Then an outer layer of high-density polyethylene was extrusion molded around the core by using a revolving nozzle to form helical grooves A. The entire diameter of the spacer was 5.7 mm while a diameter measured between bottoms of the opposite grooves was 2.9 mm, with a groove width being 1.3 mm. Each groove changes the direction of its helix by 360° and at a distance of 300 mm so that the same pattern appears at a 600 mm pitch.

In the optical fiber carrying spacer of this embodiment depicted in FIG. 2(a), each groove includes main portions 3 and 3' inclined at a predetermined angle to the longitudinal axis (a neutral axis l) of the spacer, linear extra-length portions 1 and 1' provided at direction-of-helix changing positions (0°, 360°) substantially in parallel to the longitudinal axis (l), for permitting a smooth change of direction from right to left and vice versa, and linear compensating portions 2 and 2' each spaced an angular distance of 180° apart from the extra-length portion. The total lengths of the extra-length portions 1 and 1' are equal to the total lengths of the compensating portions 2 and 2'. That is to say, in one turn of each groove A around the spacer the extra-length portion 1 is substantially equal to the compensating portion 2 in length and the extra-length portion 1' and the compensating portion 2' are also of substantially equal length.

Nylon-coated optical fibers of 0.9 mm in diameter were loosely fitted into the grooves of the above spacer and a polyethylene tape was wound around the spacer over a length of 2.5 m, for use as a sample for a bending test.

Apparent variations in length of the optical fibers relative to the spacer were measured when the sample was bent in a semi-circular or circular form with different lengths. As seen from Table 1 hereinafter, when the length of the bent portion of the sample was an integral multiple of the helical pitch 300 mm, the length of the optical fibers relative to the spacer did not change. Even when the length of the bent portion was not an integral multiple of the helical pitch, apparent variations in lengths of the optical fibers were found to be the same as in the case where helical grooves continuously extend in one direction as in a reference example described later. It was thus demonstrated that the spacer of this Example would practically prevent the optical fibers from being subjected to stresses which would otherwise be applied thereto along the longitudinal direction.

In this Example, the linear portions 1, 1', 2 and 2' were each about 25 mm in length.

Comparative Example 1

A spacer was produced which was exactly identical in structure with the spacer of Example 1 except that no compensating portions were provided, as shown in FIG. 2(b).

The spacer of this comparative example was also checked for apparent variations in lengths of optical fibers fitted in the helical grooves when the spacer was bent in the same manner as in Example 1. When the spacer was bent into a semi-circular form over lengths which were integral multiples of the helical pitch, the lengths of the optical fibers varied by about +2 mm on the inside of the curvature and by about −1 to −2 mm on the outside of the curvature, both relative to the spacer. When the spacer was bent into a circular form, the relative length variations were about +3.3 to +4 mm on the inside of the circle and about −2 to −3 mm on the outside of the circle.

Comparative Example 2

A spacer was produced which was identical in structure with the spacer of Example 1 except that the direction of helix was changed every half turn (180°) around the spacer and that no compensating portions were provided, as depicted in FIG. 2(c). The semi-helical pitch was 300 mm, so that the same pattern was repeated at a 600 mm pitch.

The spacer of this example was also subjected to bending tests similar to those mentioned above. When the spacer was bent into a semi-circular form, the lengths of the optical fibers varied by about +3 to +4 mm and by about −3 mm on the inside and the outside of the curvature, respectively, relative to the spacer. When the spacer was bent into a circular form, the apparent length variations were +4.6 to +5.7 mm and −6.3 to −7.0 mm on the inside and the outside of the circle, respectively. These measured values indicate that the spacer of this example is not suitable for use in a curved form.

Reference Example 1

A spacer was made which was identical in structure with the spacer of Example 1 except that continuous helical grooves were turned around the spacer at a pitch of 300 mm, without direction changes as shown in FIG. 2(d). The spacer with optical fibers fitted in the grooves was subjected to similar bending tests, in which substantially no variations were observed in the lengths of the optical fibers, as in the case of Example 1.

The results of the above bending tests are shown in the following table.

TABLE 1

| | Length of bent portion Corresponding Diameter | 600 mm | 900 mm | 1200 mm | 1500 mm | 750 mm | 1050 mm |
|---|---|---|---|---|---|---|---|
| | Semi-Circular | 382 mm | 573 mm | 764 mm | 955 mm | 477 mm | 668 mm |
| | Circular | 191 mm | 286 mm | 382 mm | 477 mm | 239 mm | 334 mm |
| Example 1 | Semi-Circular | ±0 | ±0 | ±0 | ±0 | ±0.5 | ±0.5 |
| | Circular | ±0 | ±0 | ±0 | ±0 | ±1.0 | ±0.5 |
| Comparative Example 1 | Semi-Circular | +2.0 −1.2 | +2.0 −2.0 | +1.9 −1.0 | +2.0 −1.0 | +1.5 −1.0 | +1.5 −1.5 |
| | Circular | +4.0 −2.6 | +3.7 −2.2 | +3.3 −3.1 | +3.6 −2.0 | +4.0 −3.1 | +3.8 −3.6 |
| Comparative Example 2 | Semi-Circular | +3 −2.9 | +3.2 −3.0 | +3.7 −3.4 | +3.3 −3.4 | +3.6 −3.4 | +4.0 −3.6 |
| | Circular | +5.7 −6.8 | +4.8 −6.3 | +4.6 −7.0 | +4.7 −6.9 | +8.0 −6.3 | +6.5 −7.5 |
| Reference Example 1 | Semi-Circular | ±0 | ±0 | ±0 | ±0 | ±0.5 | ±0.5 |
| | Circular | ±0 | ±0 | ±0 | ±0 | ±0.5 | ±0.5 |

The spacer of each of Example 1 and the Comparative Examples, accommodating the optical fibers, was sheathed with a thermoplastic resin to form an optical fiber cable. The optical fiber cable was once wound on a drum and then drawn out therefrom, and a transmission loss of the optical fiber was measured to compare it with a value measured prior to mounting of the optical fiber into the groove. In the cable using the spacer of Comparative Example 2, the transmission loss increased by 1.93 dB/km, but no increase in the transmission loss was observed in the cable employing the spacer of Example 1.

Example 2

A stranded wire obtained by twisting seven steel wires, each 1.0 mm in diameter, was coated over the entire area of its peripheral surface with a mixture of equal amounts of low- and high-density polyethylene, after which it was cooled and hardened. The polyethylene-coated wire rod was passed through a heated shaping nozzle of a 5.4 mm inner diameter to produce a tension member having a diameter of 5.3 mm ±b 0.05 mm. The tension member was preheated to 50° C. and then covered with high-density polyethylene by use of a rotational die having attached thereto a nozzle corresponding to the cross section of a spacer intended to be obtained. The die was reversed in rotational direction at a predetermined pitch, by which was obtained a spacer having grooves that changed helical direction to the right and left alternately.

The spacer of this Example, schematically shown in FIG. 3, is 11 mm in outer diameter and has six U-shaped grooves each having a 2.5 mm width and 2.5 mm depth, with a diameter measured between bottoms of opposite grooves being 5.6 mm. Each groove changes its direction every full turn (360°) about the spacer at a 250 mm pitch so that the same pattern appears at a 500 mm pitch. The grooves each include extra-length portions 1a and 1a' and compensating portions 2a and 2a' as depicted in FIG. 3.

In the formation of the extra-length portions 1a and 1', the die was stopped from revolving at each direction changing point (0°, 360°). For each angular range of 10° before and after the direction changing point, the revolving speed was gradually decreased from the speed for the main groove portions 3 and 3' down to 3/5 and then to 1/5 as the die approached the direction changing point and the revolving speed was gradually increased in the reverse order as the die moved away from the direction changing point. On this account, the extra-length portions 1a and 1a' are gently curved over about 40 mm.

The compensating portions 2a and 2a' were each provided at a position spaced 170° to 190° apart from the direction changing point, by stopping the revolution of the die at the 180° position so that the compensating portion was formed at a smaller angle to the longitudinal axis of the spacer than the main portions 3 and 3'. Each compensating portion was approximately 40 mm long.

For the spacer of this embodiment, a sample of 2.5 m length was prepared to have 0.9 mm diameter optical fibers loosely fit in the grooves. Different length portions of this sample were bent into semi-circular and circular forms to measure apparent variations in length of the optical fibers relative to the spacer. The tests revealed that when the length of the bent portion was an integral multiple of the helical pitch 250 mm, i.e. 500 mm, 750 mm and 1000 mm, the length of the optical fibers relative to the spacer did not change. Even when the length of the bent portion was not an integral multiple of the helical pitch, apparent variations in length of the optical fibers were found to be practically negligible. In other words, the spacer of this Example may practically prevent the optical fibers from being subjected to stresses along the longitudinal direction.

As described above in detail, the spacer of the present invention includes two kinds of linear groove portions as the extra-length and compensating portions in each helical groove at positions, for example, symmetrical with respect to the center axis of the spacer. Accordingly, when the spacer is bent or curved, optical fibers loosely fitted in the helical grooves do not appreciably vary in length relative to the spacer; therefore, the spacer of the present invention is highly reliable in practical use. Furthermore, since the direction of each helical groove changes to the right and left alternately, the spacer of the invention permits the fabrication of an optical fiber cable through use of a relatively simply structured device, because there is no need of rotating optical fiber supply bobbins or a cable take-up machine in combination as in the case of the conventional spacer having helical grooves extending in one direction.

We claim:

1. An optical fiber carrying spacer having helical grooves for receiving optical fibers, each groove changing the direction of its helix for each turn about said spacer, wherein each helical groove includes extra-length portions and compensating portions both formed at a smaller angle to a longitudinal axis of said spacer than main groove portions, each of said extra-length portions being provided at a position where the direction of helix changes, and each of said compensating portions being provided between adjacent extra-length portions at an angular distance ranging from $\frac{1}{4}$ to $\frac{3}{4}$ of the circumference of said spacer from said direction changing position.

2. An optical fiber carrying spacer as claimed in claim 1, wherein said compensating portions are each provided at an angular distance of about $\frac{1}{2}$ of said circumference of said spacer from said direction changing position.

3. An optical fiber carrying spacer as claimed in claim 2, wherein said extra-length portions and said compensating portions have equal lengths in one turn of said helical groove about said spacer.

* * * * *